United States Patent

[11] 3,603,264

[72] Inventor Paul Von Arx
Gelterkinderstrasse 31., CH 4450 Sissach, Switzerland
[21] Appl. No. 823,766
[22] Filed May 12, 1969
[45] Patented Sept. 7, 1971
[32] Priority May 14, 1968
[33] Switzerland
[31] 7431/68

[54] TUBE INSPECTING VEHICLE
7 Claims, 5 Drawing Figs.

[52] U.S. Cl. ............................................. 104/138 G,
14/23, 24/123 A, 24/132, 29/433, 61/67, 104/183,
138/97, 174/37, 187/12, 214/100, 254/134.3 FT,
299/19
[51] Int. Cl. ........................................... B61b 11/00,
B61b 13/00, B66f 9/00
[50] Field of Search ............................................. 14/23;
24/81 CC, 114.5, 123.1, 132, 134 Q, 123 A;
29/433; 61/67; 104/138, 183, 138 G.; 138/97, 103,
104; 174/37; 187/10, 12; 254/134.3 FT, 134.5,
134.6; 299/19; 214/100

[56] References Cited
UNITED STATES PATENTS

| | | | |
|---|---|---|---|
| 722,502 | 3/1903 | Edison | 104/183 |
| 1,552,640 | 9/1925 | O'Neil | 24/114.5 |
| 1,804,148 | 5/1931 | Church | 104/138 X |
| 2,412,941 | 12/1946 | Bannerman et al. | 24/114.5 X |
| 2,440,012 | 4/1948 | Haver | 24/123 X (.1) |
| 2,922,625 | 1/1960 | Heacock | 104/183 X |
| 3,018,086 | 1/1962 | Raney | 104/138 X |
| 3,089,434 | 5/1963 | Andreasen | 104/138 |

Primary Examiner—Arthur L. La Point
Assistant Examiner—Howard Beltran
Attorney—Karl F. Ross ABSTRACT: An inspection vehicle and device for displacing elongated members, e.g. electrical cables, wires and the like, through tubular bodies such as pipes, conduits, shafts, tunnels and ducts, in which a double-wheel carriage, having the configuration of a gun carriage or bogie, is used. The double-wheel carriages each having an axis extending transversely of the cable and connected thereto, e.g. via clamps or latches, and are spaced apart along a control member running parallel to the cable and provided with abutments which entrain the carriages therewith. The carriages are so connected to the control cable as to allow twisting thereof without effect on the carriages.

PATENTED SEP 7 1971

Paul Von Arx
INVENTOR.

BY

Karl F. Ross
Attorney

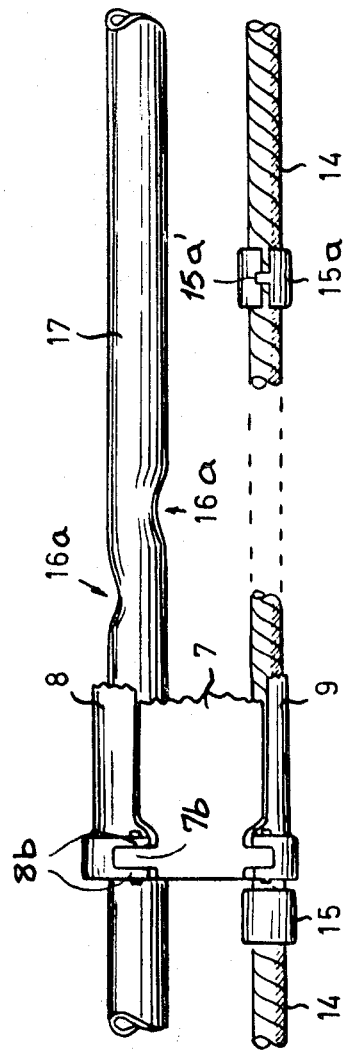
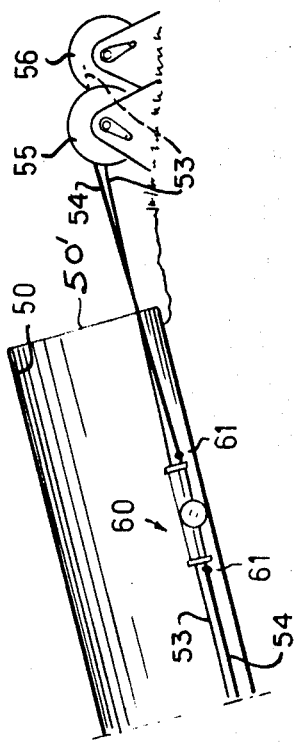
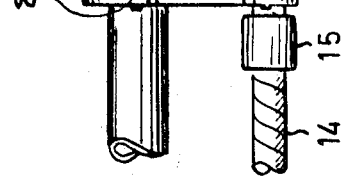
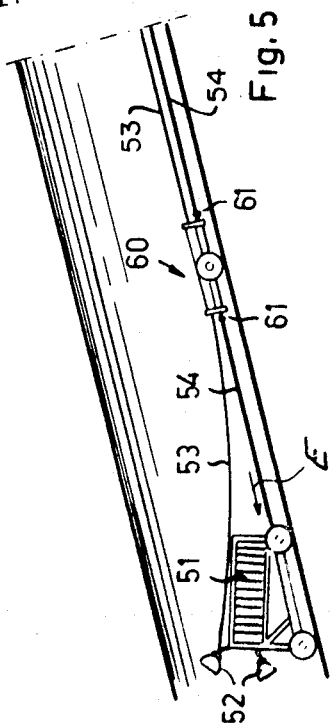
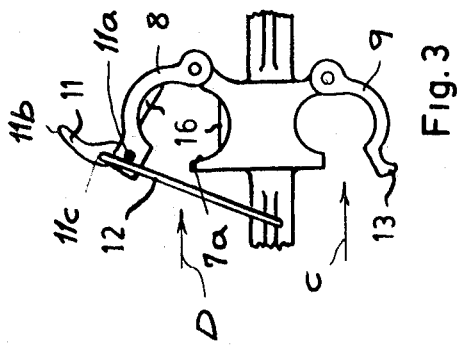

TUBE INSPECTING VEHICLE

My present invention relates to a system for the displacement of elongated members through tubular channels and, more particularly, to an arrangement for drawing a wire through a tube, duct, tunnel or other elongated structure.

It is frequently desirable, in connection with elongated hollow structures, especially pipes, tunnels, ducts, conduits and the like, to draw an electrical line, cable, pipe, hose or other elongated member therethrough. For example, it may be desired to inspect a large-diameter pipe in which case an illumination assembly can be introduced into the elongated duct and connected with an electrical source external thereof via an electric line. In other systems, electrical equipment within a tunnel, conduit or pipe may be energized by a source external thereof through lines running into the pipe, duct or tunnel from an open end. In the cleaning of pipes, the internal coating thereof and treatment of interior pipe surfaces, it is occasionally desirable to introduce a fluid into the duct through a hose or line extending into the latter from an open end. Furthermore, it is occasionally desirable to position sensing lines, control lines, communication lines or power lines in subsurface ducts of considerable length as a temporary or permanent measure.

In all of these cases, a significant problem arises when the elongated member, i.e. the relatively small-diameter electric line, tube, cable, wire or the like, must be dragged along the surface of the duct or channel through which displacement is desired. For relatively short ducts, there is substantially no difficulty, although with increasing duct length, the resistance to displacement of the wire increases by virtue of the weight of the wire dragged along the duct and the increasing contact surface. As a practical matter, it has been found that the friction force resisting displacement of an elongated member in a duct increases such that when duct lengths of several hundred meters are encountered, e.g. in the pressure pipes of water-powered installations such as hydroelectric generators, the displacement of elongated members through the pipe becomes almost impossible. The problem is especially acute when the system is to be used for the inspection, treatment and control of pipe lines running from a water reservoir to a turbine of a hydroelectric installation.

To eliminate the problem of increasing friction with length mentioned above, it has been proposed, in such systems, to provide, within the duct, cable-guide rollers at stations previously prepared along the duct interior in spaced-apart relationship. The cable-guide rollers must, in such cases, be mounted individually on the supports and must be removed with considerable labor and difficulty. Moreover, it has been found that the predisposition of roller supports within the ducts creates an impediment to fluid flow, i.e. the supports increase flow resistance and pressure drop, and also renders these supports likely to corrode and become useless for their intended purpose.

It is, therefore, the principal object of the present invention to provide an improved system for the guiding of elongated flexible members in ducts or the like.

Another object of this invention is to provide a system for the displacement of electric and fluid lines such as wires or cables in elongated conduits and especially the pressurized pipe line connecting a reservoir with a turbine of a hydroelectric installation.

These objects and others which will become apparent hereinafter are attainable in accordance with the present invention, with apparatus for the displacement of elongated members in a duct of considerable length which comprises a multiplicity of double-wheel carriages or bogies of a construction similar to that of a gun carriage, spaced apart along the elongated member to be drawn along the duct and releasably engageable therewith. The carriages or bogies have axes extending transversely of the elongated member or wire which is carried thereby and, preferably, are provided with elongated support members extending parallel to the wire to be displaced. The support has, at longitudinally spaced locations therealong (e.g. its opposite ends), releasable clamps engageable with the electric line.

According to a further feature of this invention, each of the double-wheel carriages is entrained by an elongated flexible but substantially inextensible spacing member, e.g. a wire rope or cable, having a pair of abutments thereon longitudinally flanking each of the double-wheel carriages for entraining same in either direction. The carriages of the present invention are, moreover, clamped onto the cable, preferably, with the same releasable clamp affixing the wire to the carriage at each end of the support of the carriage. The cable or wire rope extends parallel to the wire or electric line drawn through the duct and may be formed at spaced-apart locations with collars or ferrules forming the abutments, whereby the carriages may be rapidly attached to and detached from the elongated spacer member and the elongated transported member at the mouth of the duct. When the collars are fixed to the cable, they are adapted to be coiled on the takeup drum or reel; they may however be removable to allow detachment prior to winding up of the cable.

According to a further feature of this invention, the wheels of each carriage have a diameter greater than the spacing between the guide cable entraining the carriages and the wire supported thereby. The wheels are also of laterally outwardly convex configuration. The clamps at each end of the support preferably include arcuate seats, disposed one above the other, the upper seat being upwardly open and in the form of an upwardly facing through while the lower seat is downwardly open and also through-shaped. Each seat cooperates with a respective clamping hasp or trough-shaped cover, the two hasps of each clamp assembly at a respective end of the carriage being interconnectable by a wire loop or shackle which may be locked in place by a toggle lever or the like. The pivots of the respective hasps of each clamp are located on the same side of the carriage so that the elongated members may be inserted laterally into the seats, or the carriage may be emplaced on the elongated member with a lateral motion.

According to an essential feature of this invention the carriages are mounted upon the spacer or guide cable without impeding the twisting thereof although attachment of the electric line or elongated member carried by the bogies may be such that relative twisting is impeded. The above and other objects, features and advantages of the present invention will become more readily apparent from the following description, reference being made to the accompanying drawing in which:

FIG. 3 is a detail view of the clamp of the bogie of FIG. 2 in its open position;

Figure 1:
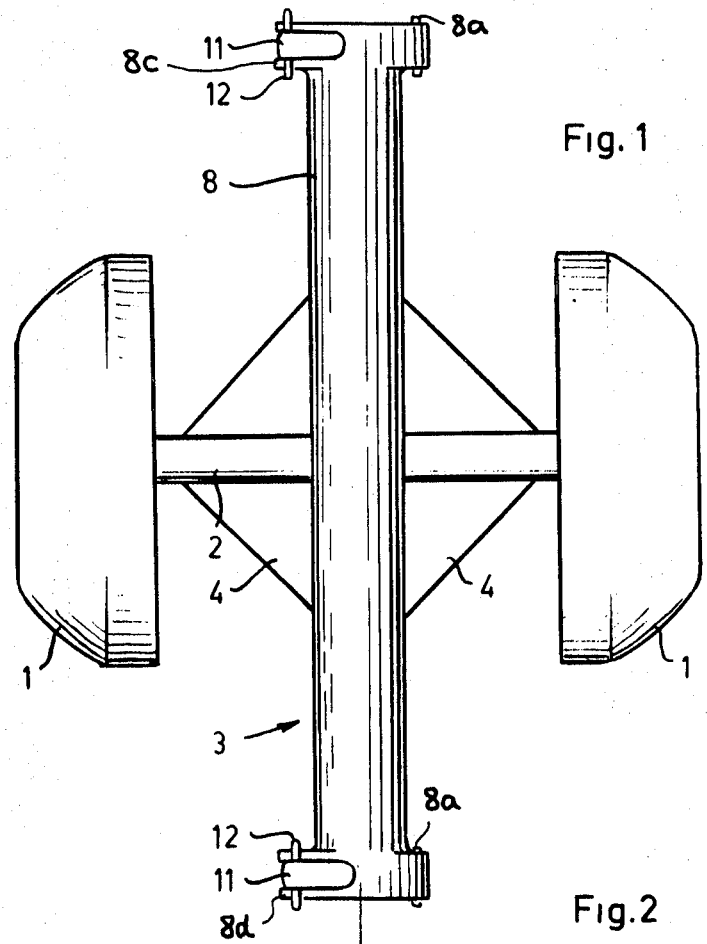
FIG. 1 is a plan view of a carriage or bogie, according to the present invention.
Figure 2:
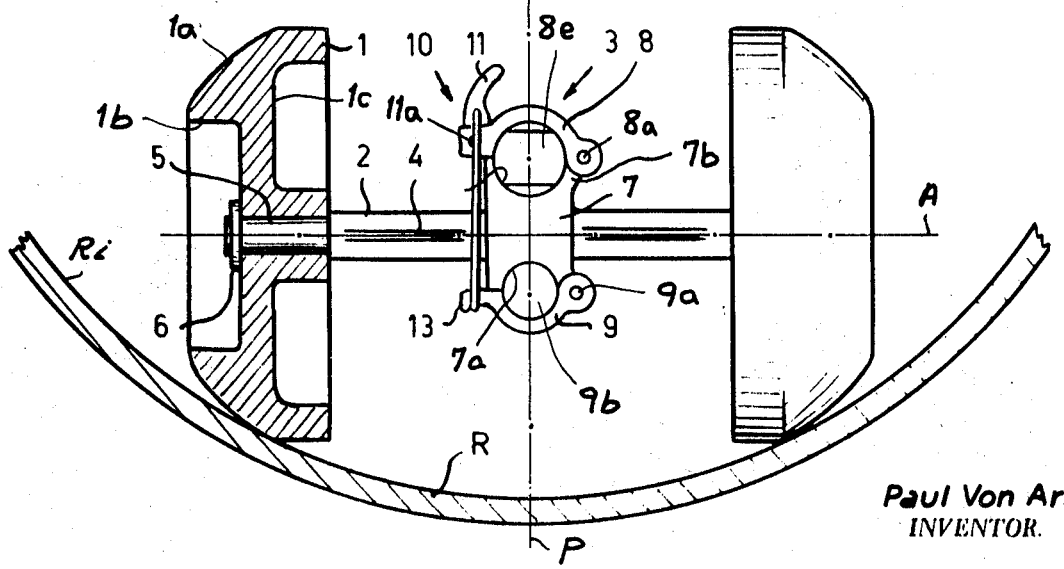
FIG. 2 is an end view of the double-wheel carriage, partly in section.

FIG. 4 is a side view of the carriage, showing its relationship to the supported line and the guide cable, partly broken away; and FIG. 5 is a diagram illustrating how the system of the present invention is used, for example, in inspecting the interior of a pressure line connecting a reservoir with a turbine of a hydroelectric installation. In FIGS. 1 and 2 of the drawing, I have shown a carriage or bogie, in accordance with the present invention, which is designed for use in a system of the type shown in FIG. 5 and resembles a gun carriage. The carriage is intended to entrain an electric line or other elongated member 17 through a pipe or duct, a portion of which is shown in section at R in FIG. 2.

The carriage or bogie of FIGS. 1 and 2 comprises a pair of wheels 1 rotatably mounted on the stub shafts 5 of an axle 6 which is secured, partly via reinforcing webs 4 in the form of triangular plates, to a superstructure 3.

The wheels 1 are outwardly convex at one end to engage the curved inner wall $R_i$ in a self-centering arrangement such that the superstructure 3 tends to lie generally in the vertical plane P while the axis A of the wheels extends perpendicular to the plane P. An axial recess 1b in each wheel accommodates a spring ring 6 which retains the wheel on the stub shaft 5. An annular recess 1c may be provided along the inner face of each wheel to reduce the mass thereof.

As previously described, the axle 2 and the superstructure or chassis 3 are rigidly connected with one another in a cruciform configuration as illustrated in FIG. 1, the chassis comprising a cast central web 7 from which the axle 2 projects laterally in opposite direction. The triangular reinforcing ribs 4 may be integral (unitary) with the axle 2 and the central member 7 or may be welded thereto.

Along its upper and lower sides, the member 7 is provided with an upwardly open concave seat 7a adapted to receive an electric line, compressed-gas pipe or other elongated member 17 which may be clamped against the seat by a downwardly concave cover or hasp 8 which is pivotally connected to member 7 via the pintles 8a best seen in FIG. 1. To this end, the chassis member 7 is formed at each end with an upstanding lug 7b (FIGS. 2 and 4) while the ends of the trough-shaped cover 8 are formed with bifurcated lugs 8b receiving the lug 7b between them. The pintles 8a traverse the lugs 7b 8b, and define a pivoting axis for the cover 8 parallel to the elongated member 17 to be received in the seat 7a. At each end, opposite the lugs 8b, the cover 8 is provided with a pair of outwardly projecting lugs 8c and 8d upon which toggle levers 11 are fulcrumed at 11a. An elongated wire loop or shackle 12 is swingably mounted in each lever 11 at a location 11c intermediate its free end 11b and the fulcrum 11a. That shackle 12 is designed to engage around the lugs 8c, 8d and corresponding lugs 13 of a lower trough-shaped cover or hasp 9 which cooperates with the seat 7c at the bottom of member 7. Seat 7c faces downwardly and is designed to receive the guide cable 14 as will be apparent hereinafter.

The cover 9 is provided with pintles 9a pivotally mounting this cover upon member 7 at the same side as the pintles 8a so that the covers 8 and 9 may be swung respectively upwardly and downwardly to allow insertion of members 14 and 17 from the left, i.e. in the directions of arrows D and C in FIG. 3. The covers 9 thus have their lugs 13 engageable between wire loops 12 when the covers are in their closed position (FIG. 2). When, however, the loop 12 of each clamp is swung outwardly to free the lug 13 (FIG. 3), the covers 8 and 9 may be swung respectively in the clockwise and counterclockwise senses about their respective pivots to allow the seats 7a and 7c to accommodate the electric line or hose 17 and the guide cable 14, respectively.

In the clamping of the assembly, the covers 8 and 9 are closed about the respective elongated members (FIG. 2) so that the loop 12 is substantially coplanar with the pivot 16 (dead center position of the toggle lever 11), whereupon levers 11 are swung in the clockwise sense about their pivot 16 to an offcenter position in which the clamps 10 are locked. To release the locks, levers 11 may be swung in the counterclockwise sense (FIGS. 1 and 2) until the pivot point 11c shifts to the other side of the dead center position (FIG. 3), thereby releasing the loops 12 from the lugs 13 and permitting the covers 8 and 9 to open (FIG. 3).

The guide cable 14 and the line (electric or fluid) 17 are connected with the carriage of FIGS. 1-3 only as they are inserted into the pipe or duct R. Thus these elongated members may be paid off respective supply reel or a common supply reel and advanced into the duct in the customary manner. At the mouth of this duct, a workman simply swings back the covers 8 and 9 of which carriage and mounts them laterally upon the cable 14 and the elongated member 17, closes the covers and clamps the latching levers 11. Conversely, when the elongated members are withdrawn through the mouth of the duct, the carriages are rapidly unlatched and removed.

The lower cover 9 forms with the seat 7c of the body 7 a cylindrical channel 9b in which the guide cable 14 is received but is not clamped so that twisting of the cable within the channel 9b or twisting of the carriage upon the cable 14 is always possible. Ahead of and behind the carriage, in the direction of displacement thereof (arrow E in FIG. 5), the cable 14 is formed with metal ferrules or collars 9 constituting abutments which entrain the carriage in the direction in which the cable 14 is drawn. Since the guide cables 14 are of the twisted-strand type (see FIG. 4) as they are coiled up or paid off the respective windlass reel or drum, they twist without however applying the twist to the carriages as a result of the free rotation permitted by channels 9b.

At spaced locations along the seat 7a and the cover 8 of the upper latch arrangement, I provide projections 16 which extend inwardly into the channel 8e receiving the line 17 so that the line 17 is clamped and deformed at 16a to prevent relative longitudinal displacement of carriage and line as well as relative torsional or twisting movement thereof.

While in the system illustrated in the drawing the carriage is shown to clamp a single compressed-air line 17 to the body 7, it will be apparent that the clamp may accommodate one or more electric cables, one or more compressed-air lines, telephone, television, remote-actuation and remote-signaling lines as required. Furthermore, the clamp may be a screw-type clamp, may be provided with inserts accommodating the clamp to the elongated member to be carried, etc. The collars 15 may also be releasably mounted on the cable 14 as represented at 15a in FIG. 4. In this system, the collar is split and is provided with a tongue 15a' engaging a recess of the collar so that upon withdrawal of the tongue 15a' from the recess, the collar may be spread and removed from the cable 14.

In FIG. 5, I show a system using the carriage illustrated in FIGS. 1-4 for the inspection of a duct 50 of a size such that an inspection truck 51 can be introduced through the open end 50' of the duct to carry an inspector or remotely monitored inspection equipment down the length of the duct.

The duct is of the type used to connect a water reservoir with the turbine of a hydroelectric plant. To enable the inspector to see the interior of the duct, the duct 50 is provided with lamps 52 with respective reflectors, the lamps being energized via the electric line 53 clamped in the carriages 60 which are of the type shown in FIGS. 1-4.

The truck 51 is lowered into the pipe 50 by a twisted-strand cable 54 paid off a windlass 55 at the mouth of the duct. A cable drum 56 delivers the electric line 53 to the duct at the same rate. After introduction of the inspection truck into the duct 50, at every 20 meters (approximately), double-wheeled carriages 60 are clamped onto the electric line 53 and locked about guide cable 54 which is provided with abutment collars 61 as previously described. The windlasses 55 and 56 are dimensioned and driven so that the guide cable and the electric line are fed at an identical speed to the pipe 50 and are wound up at identical speeds. It is also desirable to provide a telephone cable between the truck 51 and the exterior so that the inspection crew can signal the exterior crew to return, advance, stop, etc. When pipes of small diameter are inspected, the truck 51 may carry a television camera and, when cleaning of the exterior of the pipe or coating thereof with anticorrosion media is desired, compressed-air lines and electric powered cables to drive the equipment may also be mounted on the carriages 60.

The improvement described and illustrated is believed to admit of many modifications within the ability of persons skilled in the art, all such modifications being considered within the spirit and scope of the invention except as limited by the appended claims.

1. An apparatus for introducing an elongated member into a duct, comprising a guide cable displaceable along said duct, a plurality of wheeled carriages spaced along said cable and rollingly receivable in said duct, means on each of said carriages engageable with said elongated members for supporting same in said duct, said cable being provided with spaced-apart abutments adapted to bear against said carriages for displacing same along said duct, and means on each of said carriages for retaining same on said cable while permitting twisting of said cable without torsional entrainment of said duct.

2. The apparatus defined in claim 1 wherein each of said carriages is provided with releasable clamping means for locking said elongated member to the respective carriage and preventing relative torsional and longitudinal displacement of the elongated member and each carriage.

3. The apparatus defined in claim 2 wherein said abutments are removably mounted on said cable.

4. The apparatus defined in claim 2 wherein said abutments are collars fitted on said cable.

5. The apparatus defined in claim 1 wherein each of said carriages comprises an elongated body lying generally in a plane perpendicular to the respective wheel axis, an axle defining said axis and rotatably carrying said wheels extending laterally of said body and rigid therewith on opposite sides of said body, and reinforcing ribs spanning said axle and said body, said body having upwardly and downwardly concave trough-shaped seats at its upper and lower sides respectively receiving said member and said cable, said clamping means including a pair of trough-shaped covers pivotally connected to said body on the same side thereof and swingable on said body to overlie said seats and retain said member and said cable therein respectively, and common latch means for both said covers.

6. The apparatus defined in claim 5 wherein said latch means includes a respective toggle lever fulcrumed on the upper cover, a wire loop swingable on each toggle lever, and a lug at each end of the lower cover engageable by the wire loop of the respective toggle lever for releasably drawing said covers together against said body, said lower cover defining a cylindrical channel for said cable receiving same with freedom of torsional movement, the upper cover and the upper seat being provided with mutually inwardly extending formations engageable with said member for preventing relative displacement of said member and the respective carriage.

7. An apparatus for inspecting a duct connecting a reservoir of a hydroelectric plant with a turbine, comprising, in combination, an inspection truck receivable within said duct and having illuminating means for projecting light into said duct; a flexible cable connected at an end to said truck and adapted to extend through said duct; a supply reel externally, of said duct and connected to said cable for controlling the displacement thereof within said duct, said cable being provided with spaced-apart abutment members; a plurality of carriages spaced along said cable, each of said carriages being formed with an elongated body extending generally along said cable, wheels rotatably mounted on said body on opposite sides of said cable and rollingly engaging a wall of said duct for supporting said cable therein and first releasable clamping means on said body adapted to surround said cable with clearance to enable twisting of said cable without torsional effect upon the carriage, said first clamping means being engageable by a respective abutment for displacement of the carriage within said duct by said cable; an electric line terminating at said truck, said bodies each being provided with second releasable clamping means engageable with said electric line for supporting same within said duct; and a supply reel externally of said duct for feeding said cable into the latter, each of said clamping means including a pair of clamping members spaced longitudinally apart along the respective body.